United States Patent
Rojas Restrepo et al.

(10) Patent No.: US 10,342,238 B2
(45) Date of Patent: Jul. 9, 2019

(54) HOUSEHOLD APPLIANCE MIXING ARRANGEMENT

(71) Applicant: Aktiebolaget Electrolux, Stockholm (SE)

(72) Inventors: Monica Maria Rojas Restrepo, Stockholm (SE); Martin Kwarnmark, Stockholm (SE)

(73) Assignee: Aktiebolaget Electrolux (SE)

( * ) Notice: Subject to any disclaimer, the term of this patent is extended or adjusted under 35 U.S.C. 154(b) by 0 days.

(21) Appl. No.: 15/321,350

(22) PCT Filed: Jul. 3, 2014

(86) PCT No.: PCT/EP2014/064207
§ 371 (c)(1),
(2) Date: Dec. 22, 2016

(87) PCT Pub. No.: WO2016/000781
PCT Pub. Date: Jan. 7, 2016

(65) Prior Publication Data
US 2017/0156348 A1 Jun. 8, 2017

(51) Int. Cl.
*A21C 1/06* (2006.01)
*A47J 43/07* (2006.01)
(Continued)

(52) U.S. Cl.
CPC ............. *A21C 1/06* (2013.01); *A21C 1/1405* (2013.01); *A21C 1/149* (2013.01); *A47J 43/07* (2013.01);
(Continued)

(58) Field of Classification Search
CPC .. B01F 5/006; B01F 7/00275; B01F 7/00325; B01F 9/0047; A47J 43/0727; A21C 1/06
(Continued)

(56) References Cited

U.S. PATENT DOCUMENTS 743,090 A 11/1903 Koelner
898,211 A 9/1908 Friedman
(Continued)

FOREIGN PATENT DOCUMENTS

CN 86105937 A 4/1987
CN 103260490 A 8/2013
(Continued)

OTHER PUBLICATIONS

International Search Report and Written Opinion of the International Searching Authority for International Application No. PCT/EP2014/064205, dated Dec. 3, 2014, 9 pages.
(Continued)

*Primary Examiner* — Abbas Rashid
(74) *Attorney, Agent, or Firm* — RatnerPrestia

(57) ABSTRACT

A household mixer appliance having a mixing container with an inner surface and an open top, a drive arrangement and a hook. The hook has a sole attachment portion which, when attached to the drive arrangement, abuts a first inner surface portion of the mixing container inner surface. The sole attachment portion is attachable to the drive arrangement via a through hole in the first inner surface portion such that the hook is rotatable around a substantially horizontal axis of rotation within the mixing container when the hook is attached to the drive arrangement.

10 Claims, 4 Drawing Sheets

(51) Int. Cl.
  *A21C 1/14* (2006.01)
  *B01F 7/00* (2006.01)
(52) U.S. Cl.
  CPC ....... *A47J 43/0727* (2013.01); *B01F 7/00275* (2013.01); *B01F 7/00325* (2013.01); *B01F 2215/0011* (2013.01); *B01F 2215/0431* (2013.01)
(58) Field of Classification Search
  USPC .................................. 366/99, 248, 303–307
  See application file for complete search history.

(56) References Cited

U.S. PATENT DOCUMENTS

| | | | |
|---|---|---|---|
| 905,148 A | 12/1908 | Collins | |
| 915,139 A * | 3/1909 | Werner | B01F 7/048 |
| | | | 165/109.1 |
| 935,688 A | 10/1909 | Ray | |
| 960,878 A | 6/1910 | Friedman | |
| 969,311 A | 9/1910 | Van Houten | |
| 1,229,934 A * | 6/1917 | Gensheimer | A21C 1/06 |
| | | | 366/99 |
| 1,336,783 A | 4/1920 | Lauterbur | |
| 1,426,444 A | 8/1922 | Allison | |
| 1,585,155 A * | 5/1926 | Konigsberg | C21C 3/00 |
| | | | 366/101 |
| 1,585,725 A | 5/1926 | Lauterbur | |
| 2,618,471 A * | 11/1952 | Weigham | D01F 2/08 |
| | | | 192/45.02 |
| 2,723,110 A | 11/1955 | Collins | |
| 3,531,092 A * | 9/1970 | Praschak | B01F 7/162 |
| | | | 366/177.1 |
| 3,671,296 A * | 6/1972 | Funakoshi et al. | A61J 3/005 |
| | | | 118/500 |
| 3,892,388 A * | 7/1975 | Wass | B01F 7/00641 |
| | | | 366/325.7 |
| 4,334,789 A | 6/1982 | Eusterbarkey | |
| 4,357,109 A * | 11/1982 | Blakeway | B28C 5/1893 |
| | | | 366/47 |
| 4,436,432 A | 3/1984 | Drocco | |
| 4,509,860 A | 4/1985 | Lasar, III | |
| 4,630,930 A * | 12/1986 | Seiling | A21C 1/06 |
| | | | 366/189 |
| 4,650,337 A | 3/1987 | Otto | |
| 4,936,766 A * | 6/1990 | Marshall | B01J 2/10 |
| | | | 366/279 |
| 4,941,750 A * | 7/1990 | Bouchez | B01F 7/00275 |
| | | | 366/147 |
| 5,421,713 A | 6/1995 | Backus et al. | |
| 5,568,976 A * | 10/1996 | Gabriele | F16C 17/08 |
| | | | 366/312 |
| 5,758,963 A | 6/1998 | Xie et al. | |
| 6,435,708 B1 | 8/2002 | Huang | |
| 6,508,423 B2 * | 1/2003 | Gloor | B01F 7/1605 |
| | | | 241/101.8 |
| 7,404,666 B2 * | 7/2008 | Tessien | B01J 19/008 |
| | | | 366/114 |
| 7,677,790 B2 * | 3/2010 | Tessien | B01D 19/0036 |
| | | | 366/108 |
| 8,272,775 B2 * | 9/2012 | Stalder | B01F 7/00208 |
| | | | 366/144 |
| 2009/0080284 A1 * | 3/2009 | Deusser | A61B 17/8833 |
| | | | 366/191 |
| 2010/0012639 A1 | 1/2010 | Merrell et al. | |
| 2014/0000462 A1 | 1/2014 | Payen | |
| 2015/0335204 A1 * | 11/2015 | Palmer | B01F 9/0001 |
| | | | 99/348 |
| 2017/0150728 A1 | 6/2017 | Rojas Restrepo et al. | |
| 2017/0156348 A1 | 6/2017 | Rojas Restrepo et al. | |
| 2017/0156349 A1 | 6/2017 | Jahge et al. | |

FOREIGN PATENT DOCUMENTS

| | | |
|---|---|---|
| EP | 0052582 A1 | 5/1982 |
| FR | 2994815 A1 | 3/2014 |
| GB | 15304 | 6/1915 |
| JP | 09294551 A | 11/1997 |
| WO | 2006113466 A2 | 10/2006 |

OTHER PUBLICATIONS

International Preliminary Report on Patentability for International Application No. PCT/EP2014/064205, dated Jan. 3, 2017, 7 pages.
International Search Report and Written Opinion of the International Searching Authority for International Application No. PCT/EP2014/064207, dated Mar. 23, 2015, 9 pages.
International Preliminary Report on Patentability for International Application No. PCT/EP2014/064207, dated Jan. 3, 2017, 7 pages.
International Search Report and Written Opinion of the International Searching Authority for International Application No. PCT/EP2014/064209, 9 pages.
International Preliminary Report on Patentability for International Application No. PCT/EP2014/064209, dated Jan. 3, 2017, 5 pages.
Non Final Office Action for U.S. Appl. No. 15/321,346, dated Jan. 11, 2018, 21 pages.
Chinese Office Action for Chinese Application No. 201480079686.6, dated Jul. 20, 2018, 10 pages.
Non Final Office Action for U.S. Appl. No. 15/321,463, dated Aug. 7, 2018, 12 pages.
Chinese Office Action for Chinese Application No. 201480079752.X, dated Oct. 15, 2018 with translation, 15 pages.
Notice of Allowance for U.S. Appl. No. 15/321,463, dated Dec. 3, 2018, 9 pages.
Final Office Action for U.S. Appl. No. 15/321,346, dated Jun. 5, 2018, 19 pages.

* cited by examiner

HOUSEHOLD APPLIANCE MIXING ARRANGEMENT

TECHNICAL FIELD

Embodiments herein relate to a household appliance mixing arrangement.

BACKGROUND

A household appliance mixing arrangement for mixing and/or blending foodstuff commonly comprises a mixing container and a hook which is rotatable in the mixing container. The household appliance mixing arrangement may also comprise a base unit, a drive arrangement and an electric motor. The base unit often forms a support for the mixing container and the electric motor is arranged to rotate the hook via the drive arrangement. Such appliances may be referred to under different names such as mixer, food mixer, food processor, stand mixer or kitchen machine.

Hooks of household appliance mixing arrangements are typically vertically arranged, such that the hook rotates around a vertical rotation axis directed towards a bottom portion of the mixing container, describing a planetary motion. The hook is, at an upper end, attached to the drive arrangement which in turn is arranged above both the hook and the mixing container.

In GB191415304A an apparatus for mixing and stirring liquids is provided. A number of stirrer-pairs are attached by bolts to a horizontal shaft. The shaft is a through shaft, which passes through two oppositely arranged container walls. The apparatus in GB191415304A may be suitable for some applications, like for stirring liquids, but seems unsuitable for ingredients with higher viscosities. The construction of the apparatus in GB191415304A also seems somewhat complex. Further, both assembly, disassembly and cleaning of the apparatus appears to be rather time consuming.

Accordingly, there remains a need for an improved and/or an alternative household appliance mixing arrangement.

SUMMARY

The household appliance mixing arrangement, as set out herein, eliminates or at least reduces the problems and/or drawbacks associated with previously known household appliance mixing arrangements.

According to a first aspect, this is provided by a household appliance mixing arrangement comprising a mixing container with an inner surface and an open top, a drive arrangement and a hook. The hook comprises a sole attachment portion which, when attached to the drive arrangement, abuts a first inner surface portion of the mixing container inner surface, and is attachable to the drive arrangement via a through hole in the first inner surface portion, such that the hook is rotatable around a substantially horizontal axis of rotation within the mixing container when the hook is attached to the drive arrangement.

Since the hook comprises a sole attachment portion, which, when attached to the drive arrangement, abuts a first inner surface portion of the mixing container inner surface, and is attachable to the drive arrangement via a through hole in the first inner surface portion such that the hook is rotatable around a substantially horizontal axis of rotation within the mixing container when the hook is attached to the drive arrangement, it is easy both to attach the hook to the mixing container and to remove the hook from the mixing container.

A sole attachment portion decreases a risk of leakage between the hook and the mixing container, as compared to solutions according to the prior art where two shaft apertures are required.

Further, the arrangement according to the above is very easy to use, due to its open top mixing container combined with the substantially horizontal axis of rotation. This also provides for a very steady household appliance mixing arrangement with a relatively low center of gravity.

The drive arrangement may be arranged entirely below a highest portion of the mixing container when positioned with the open top facing upwards.

Since the drive arrangement may be arranged entirely below a highest portion of the mixing container, the open top is unobstructed for a user that would like to add ingredients into the mixing container. Hereby e.g. a baking process in which a user adds one ingredient at a time to the mixing container is facilitated.

The inner surface of the mixing container may comprise a substantially flat second surface portion, arranged diametrically opposite the first surface portion along the axis of rotation.

Since the inner surface of the mixing container may comprise a substantially flat second surface portion, arranged diametrically opposite the first surface portion along the axis of rotation, a distance between the first and second surface portions is less than if the mixing container would have had a semi-spherical shape. Hereby a length of the hook, along the axis of rotation, is decreased compared to a hook for use in a semi-spherical-shape-mixing-container. With a relatively shorter hook, as in the embodiments herein, a more rigid hook-construction is achieved. In addition, the relatively shorter hook provides for less momentum acting on the hook and/or the attachment portion when forces from e.g. dough kneading are acting on the hook and/or the attachment portion.

The inner surface of the mixing container may comprise a second surface portion, arranged diametrically opposite the first surface portion along the axis of rotation, the second surface portion comprising a protuberance which is directed towards the first surface portion.

Since the inner surface of the mixing container may comprise a second surface portion, arranged diametrically opposite the first surface portion along the axis of rotation, the second surface comprising a protuberance which is directed towards the first surface portion, foodstuff mixed within the mixing container will not stick to the inner surface. Further, due to the protuberance, foodstuff in the mixing container may be mixed and kneaded during a larger part of each rotation cycle. When mixing and/or kneading foodstuff such as dough, gluten strands/networks are efficiently developed. Moreover, the protuberance in combination with the hook facilitates releasing dough from the hook. Hereby the dough is allowed to return to another portion of the hook in a subsequent hook rotation cycle, whereby both mixing and kneading are enhanced.

All parts of the hook, when attached to the drive arrangement, may be arranged with at least a separation distance to the second surface portion.

Since all parts of the hook, when attached to the drive arrangement, are arranged with a separation distance to the second surface portion, the hook is easily attachable and releasable to/from the drive arrangement. With a separation distance between the second surface portion and an end of the hook that faces the second surface portion, a user may release the hook through a movement along the axis of rotation. Hereby the design of the hook and/or the attachment portion can be more freely selected. The distance between the second surface portion and an end of the hook that faces the second surface portion is suitably e.g. a few millimeters or a few centimeters.

At least 40%, preferably at least 50%, more preferably at least 60% of the mixing container inner surface may have the shape of an oblate spheroid.

Since at least 40%, preferably at least 50%, more preferably at least 60% of the mixing container inner surface has the shape of an oblate spheroid, the shape of the inner surface co-operates in a favorable manner with the shape of the hook, when the hook is rotated in the mixing container. The oblate spheroid shape also makes it easier for ingredients to be integrated. With no sharp corners or radiuses, the oblate spheroid shape of the mixing container further facilitates cleaning of the mixing container.

The hook may, when in a lowest position, extend substantially in parallel with the inner surface of the mixing container along at least 50%, preferably at least 70%, of is length.

Since the hook, when in a lowest position, extends substantially in parallel with the inner surface of the mixing container along at least 50%, preferably at least 70%, of is length, foodstuff will be pressed into a gap between the hook and the mixing container when the hook is rotated, whereby both mixing and kneading is improved. The hook is in the lowest position when a hook center of gravity is arranged as low as possible within the mixing container.

Thus, hereby is provided an alternative household appliance mixing arrangement and/or a household appliance mixing arrangement eliminating or at least reducing the problems and/or drawbacks associated with prior art household mixing appliances.

BRIEF DESCRIPTION OF THE DRAWINGS

The various aspects of embodiments herein, including its particular features and advantages, will be readily understood from the following detailed description and the accompanying drawings, in which.

DETAILED DESCRIPTION

Embodiments herein will now be described more fully with reference to the accompanying drawings. Like numbers refer to like elements throughout.

Well-known functions or constructions will not necessarily be described in detail for brevity and/or clarity.

Figure 1:
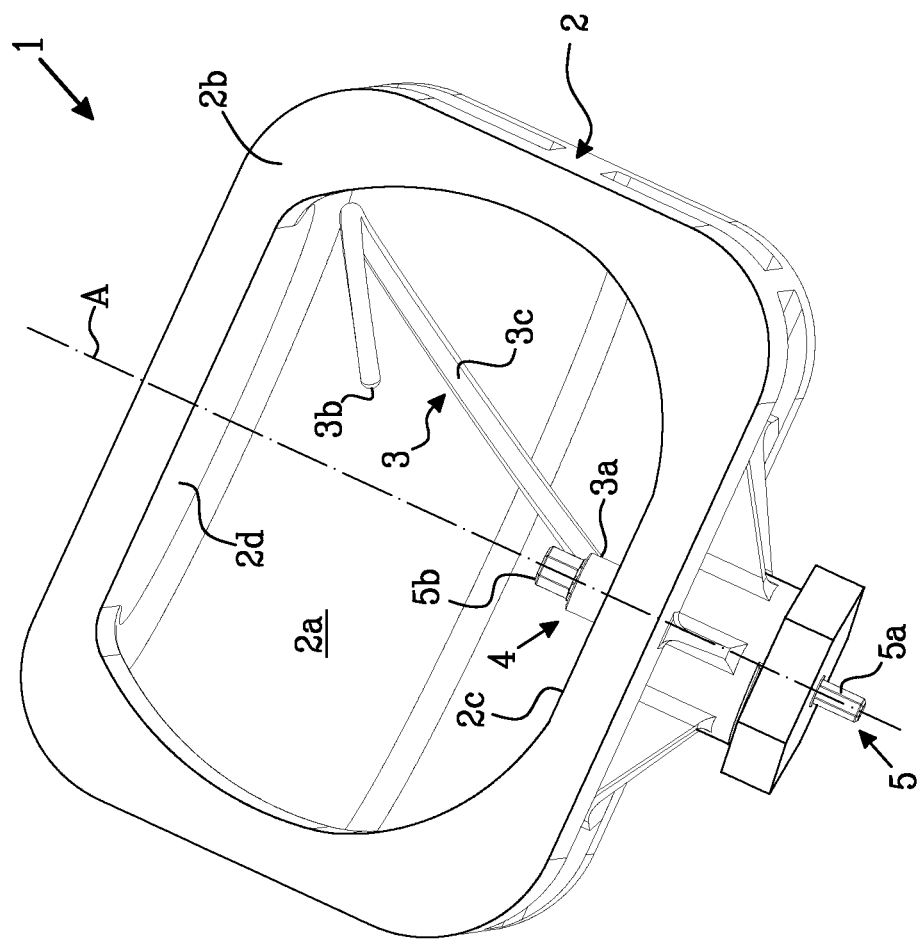
FIG. 1 illustrates a perspective view of a household appliance mixing arrangement according to some embodiments.

FIG. 1 illustrates a household appliance mixing arrangement 1 with a mixing container 2 and a hook 3. The mixing container 2 is a bowl-shaped mixing container with an inner surface 2a and an open top 2b, in FIG. 1 depicted in perspective from above. The mixing container 2 can be made of any durable material, such as plastics, metal and/or glass and the hook 3 may be made e.g. of metal and/or plastics.

The hook 3 comprises a sole attachment portion 4 which abuts a first inner surface portion 2c of the mixing container inner surface 2a. The first inner surface portion 2c is provided with a through hole, illustrated in FIG. 2.

Figure 3:
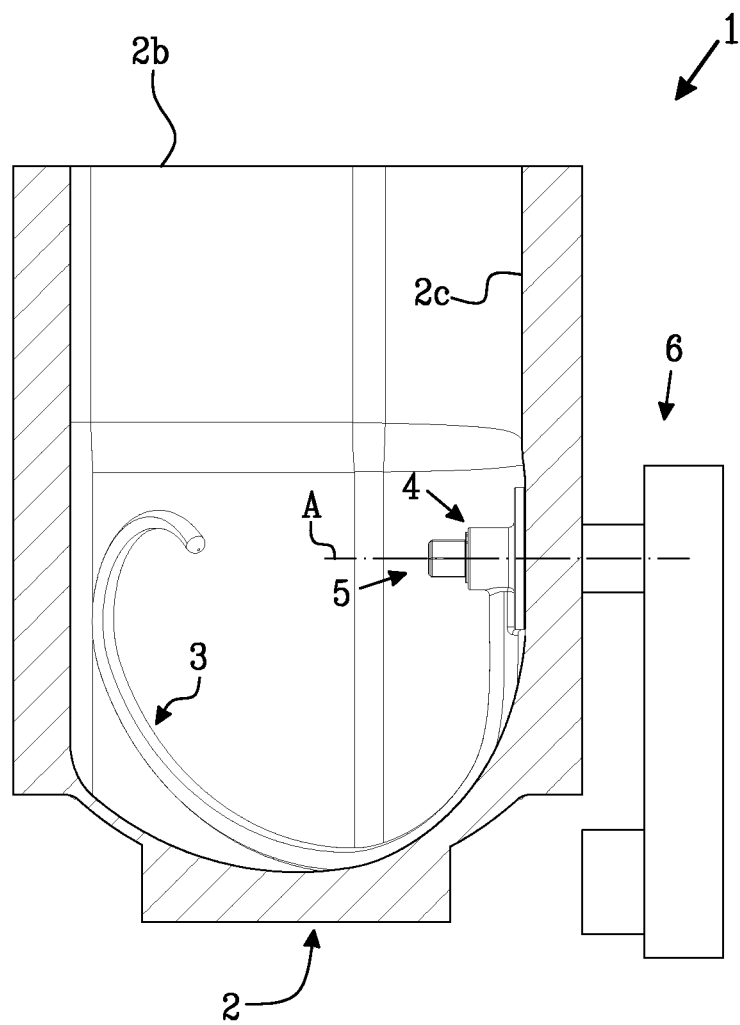
FIG. 3 illustrates a cross section of the FIG. 1 household appliance mixing arrangement.
Figure 4:
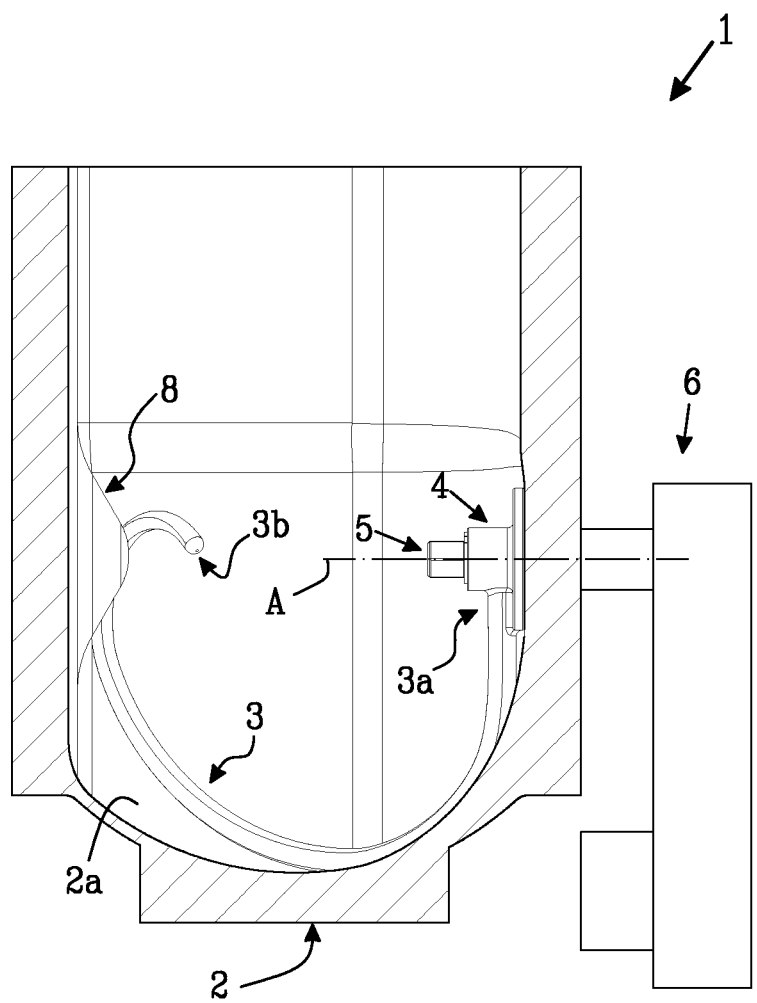
FIG. 4 illustrates a cross section of the household appliance mixing arrangement according to another embodiment.

In FIG. 1 also an axle shaft 5 is illustrated. The axle shaft 5 is part of a drive arrangement which is illustrated in FIG. 3 and FIG. 4. A rotational movement caused by an electric motor is transferred to a first portion 5a of the axle shaft 5. Such a rotational movement may be transferred directly to the first portion 5a of the axle shaft 5 or indirectly via a drive belt, a clutch or similar.

The axle shaft 5 extends into the mixing container via the through hole, such that a second portion 5b of the axle shaft is arranged in the mixing container 2 interior.

At least one surface of the attachment portion 4 is substantially in parallel with the first inner surface portion 2c, such that they are pressed against each other when the hook 3 is attached to the second portion 5b. When the attachment portion 4 and the first inner surface portion 2c abuts each other they at least partly seal the through hole, such that ingredients within the mixing container are prevented from slipping out via the through hole. One or more sealing arrangements, such as one or more gaskets, may be arranged in the vicinity of the attachment portion 4. Such a sealing arrangement may be arranged between the attachment portion 4 and the first inner surface portion 2c, and/or in the through hole between the drive arrangement 6 and the mixing container 2.

The hook 3 may be attached to the second portion 5b of the axle shaft 5 e.g. via threads, via a screw/bolt arrangement, via a bayonet coupling, with a locking pin, via a snap-on-arrangement or by any other suitable attachment arrangement which may handle forces and/or momentum acting between the hook 3 and the axle shaft 5 during operation of the household appliance 1. When the hook 3 is detached from the axle shaft 5 both the hook 3 and the mixing container 2 can be removed from the axle shaft 5 and other parts of the drive arrangement 6.

The hook 3 has a proximal end 3a, a distal end 3b and a curved elongated portion 3c extending between the proximal end 3a and the distal end 3b. The proximal end 3a comprises the attachment portion 4. The hook 3 is, when attached to the axle shaft 5, rotatable around a substantially horizontal axis of rotation A within the mixing container 2.

In FIG. 1 the hook 3 is illustrated in its lowest position. The hook 3 is in the lowest position when the centre of gravity of the hook 3 is as low as possible within the mixing container 2.

In the FIG. 1 embodiment, the inner surface 2a of the mixing container 2 comprises a substantially flat second surface portion 2d, arranged diametrically opposite the first surface portion 2c along the axis of rotation A. In the embodiment illustrated in FIG. 1, also the first surface portion 2c is substantially flat. The first surface portion 2c and the second surface portion 2d thus extend substantially in parallel with each other and substantially perpendicular to the axis of rotation A.

At least 40%, preferably at least 50%, more preferably at least 60% of the mixing container inner surface 2a has the shape of an oblate spheroid. A lower portion of the mixing container inner surface 2a is shaped as an oblate spheroid, while an upper part is open. An upper portion of the inner surface 2a is substantially vertical. A user may pour/place foodstuff into the mixing container 2 through the open top 2b.

The shape of an oblate spheroid may be referred to as a rotationally symmetric ellipsoid with a minor axis shorter than a major axis. The minor axis of the at least partly oblate spheroid may substantially coincide with the rotation axis A of the hook 3. Hereby the household appliance mixing arrangement 1 is both steady and compact. With the minor axis substantially coinciding with the rotation axis A of the hook 3, a width of the household appliance mixing arrangement 1 along the axis of rotation A is relatively short.

The first inner surface portion 2c and the second inner surface portion 2d are portions of the inner surface portion 2a.

The hook 3, when in its lowest position, extends substantially in parallel with the inner surface 2a of the mixing container 2 along at least 50%, preferably at least 70%, of is length. In the lowest position of the hook 3 the proximal end 3a extends downwards from the attachment portion 4 when the attachment portion 4 is attached to the drive arrangement 6.

Since the hook 3 is attached to the drive arrangement 6 via a through hole in a side wall portion of the mixing container 2, a user who would like to add ingredients, e.g. during baking, mixing and/or kneading, may easily do so, since no drive arrangements or other parts of the household appliance mixing arrangement 1 obstruct the mixer container opening. The hook 3 rotates near the inner surface 2a of the mixing container, such that the ingredients are pressed, kneaded and well-mixed between the hook 3 and the inner surface 2a when the hook 3 is rotated. The hook 3 may have a curved elongated shape. A curved elongated shape of the hook has proven to be exceptionally efficient for catching and bringing the foodstuff to be mixed and kneaded over the length of the hook 3.

Figure 2:
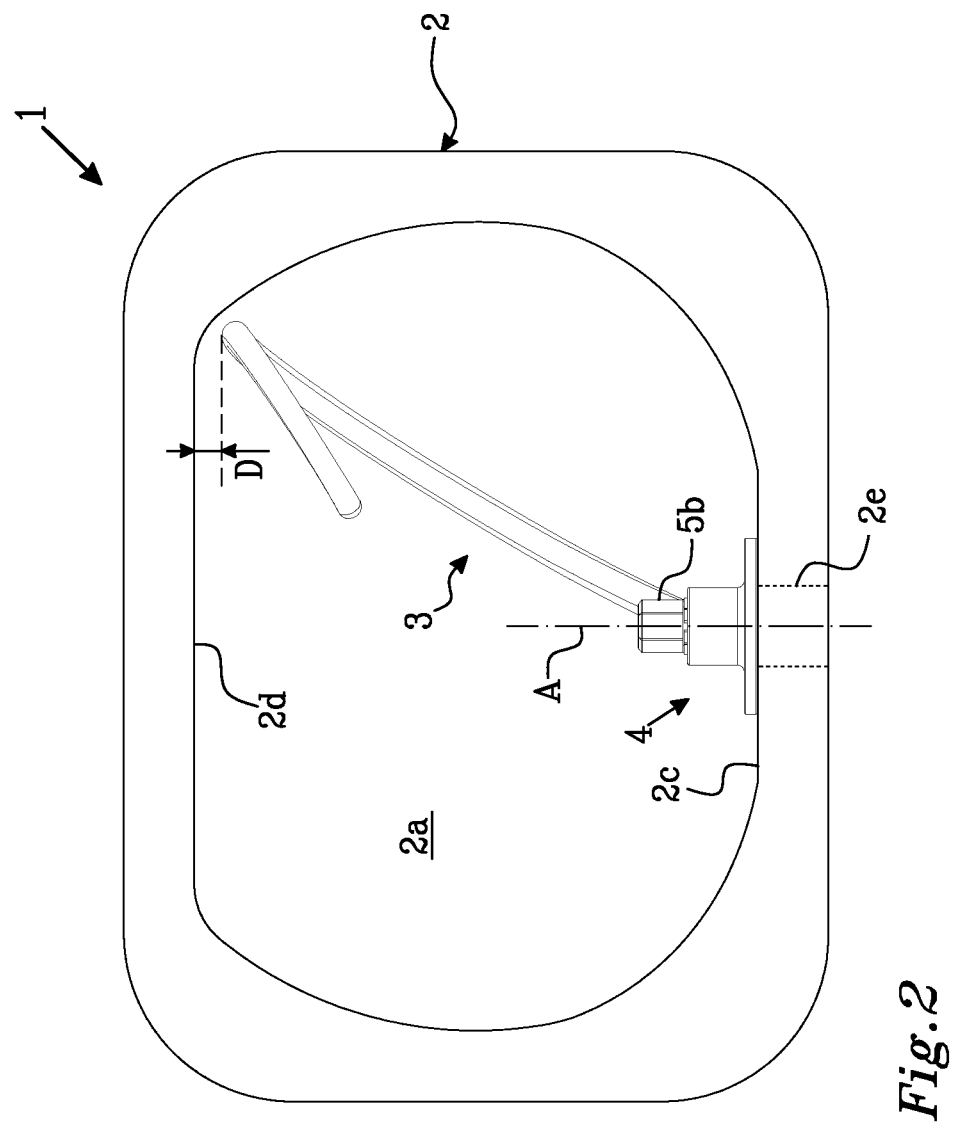
FIG. 2 illustrates the FIG. 1 household appliance mixing arrangement from above.

FIG. 2 illustrates the household appliance mixing arrangement 1 from above. Also in FIG. 2, the hook 3 abuts the first inner surface portion 2c of the mixing container 2 and is attached to the axle shaft 5 of the drive arrangement 6 via the through hole 2e. The hook 3 is illustrated in its lowest position.

The curved elongated portion follows the curvature of the inner surface 2a until the distal end turns away from the flat second inner surface portion 2d. Hereby foodstuff which is kneaded along the length of the curved elongated portion can be released from the hook 3 during a rotation cycle of the hook 3 and is ready to be further kneaded in a subsequent cycle of rotation.

The attachment portion 4 at the proximal end can be integrated as one unit with the hook 3 or alternatively be a separate part, which is attachable to the hook such that they together form the hook 3.

As illustrated in FIG. 2 all parts of the hook 3 are arranged with at least a separation distance D to the second surface portion 2d. Hereby a user may remove the hook 3 through movement along the axis of rotation A.

FIG. 3 illustrates a cross section of the household appliance mixing arrangement 1. The attachment portion 4 of the hook 3 is attached to the axle shaft 5 of the drive arrangement 6. The drive arrangement 6 is coupled to an electric motor. The attachment portion 4 abuts the first inner surface portion 2c of the mixing container 2 such that the through hole is sealed and ingredients in the mixing container 2 are prevented from escaping the mixing container via the through hole. The hook 3 is rotatable about the axis of rotation A via the axle shaft 5 of the drive arrangement 6. The drive arrangement 6 is, at least partly, arranged laterally of the mixing container 2 and entirely below a highest portion of the mixing container 2 when the mixing container 2 is arranged with its bottom part downwards and its open top upwards. The highest portion is an upper mixing container-edge which forms the open top 2b. Since all parts of the drive arrangement are arranged below the highest portion of the mixing container 2, a user may pour ingredients into the mixing container without any hindrance.

FIG. 4 generally corresponds to FIG. 3, and illustrates the household appliance mixing arrangement 1 according to a further embodiment. The proximal end 3a of the hook 3 is attached to the axle shaft 5 of the drive arrangement 6 via the attachment portion 4. The curved elongated portion of the hook 3 extends, when in the lowest position as illustrated in FIG. 4, downwards along the inner surface 2a of the mixing container 2 towards the distal end 3b of the hook 3. In the FIG. 4 embodiment the second inner surface portion 2d comprises a protuberance 8. The protuberance 8 may be directed substantially along the axis of rotation A, towards the attachment portion 4 of the hook 3.

When the hook 3 is rotated, it forms a substantially oblate spheroid-shaped solid of revolution. The substantially oblate spheroid-shaped solid of revolution at least partly corresponds to the inner surface 2a of the mixing container 2. The shape of the protuberance 8 is adapted to co-operate with the solid of revolution of the hook 3 such that both the protuberance 8 and the part of the solid of revolution which faces the protuberance 8 are bulging into the oblate spheroid-shape.

The invention claimed is:

1. A household mixer appliance comprising:
    a mixing container with an inner surface and an open top;
    a drive arrangement; and
    a hook;
    wherein the hook comprises a proximal end, a distal end and a curved portion extending between the proximal end and the distal end, the proximal end having a sole attachment portion which when attached to the drive arrangement abuts a first inner surface portion of the mixing container inner surface, and is attachable to the drive arrangement via a through hole in the first inner surface portion such that the hook is rotatable around a horizontal axis of rotation within the mixing container when the hook is attached to the drive arrangement, the hook further having a distal-most point located at its most distant point from the proximal end, the distal-most point of the hook being offset from the axis of rotation to define a circular path as the hook rotates about the axis of rotation; and
    wherein the inner surface of the mixing container comprises a second inner surface portion comprising at least 40% of the mixing container inner surface having the shape of an oblate spheroid,
    wherein the inner surface of the mixing container comprises a third inner surface portion arranged diametrically from the first inner surface portion along the axis of rotation, the third inner surface portion comprising a flat surface extending radially inward from the second inner surface portion adjacent the circular path defined by the distal-most point of the hook towards the axis of rotation of the hook, and
    wherein the distal end of the hook is spaced from the flat surface by a separation distance, such that the curved portion of the hook can knead foodstuffs against the flat surface.

2. The mixer appliance according to claim 1, wherein the drive arrangement is arranged entirely below a highest portion of the mixing container when positioned with the open top facing upwards.

3. The mixer appliance according to claim 1, wherein the third inner surface portion comprises a protuberance located between the flat surface and the axis of rotation of the hook, and extending towards the first inner surface portion.

4. The mixer appliance according to claim 1, wherein all parts of the hook are arranged with a separation distance to the third inner surface portion.

5. The mixer appliance according to claim 1, wherein the hook, when in a lowest position, extends in parallel with the inner surface of the mixing container along at least 50% of a length of the hook.

6. The mixer appliance according to claim 1, wherein the hook, when in a lowest position, extends in parallel with the inner surface of the mixing container along at least 70% of a length of the hook.

7. The mixer appliance according to claim 3, wherein all parts of the hook are arranged with a separation distance to the third inner surface portion.

8. The mixer appliance according to claim 1, wherein at least 50% of the mixing container inner surface has the shape of an oblate spheroid.

9. The mixer appliance according to claim 1, wherein at least 60% of the mixing container inner surface has the shape of an oblate spheroid.

10. The mixer appliance according to claim 1, where the curved portion of the hook positions the distal end of the hook towards the first inner surface portion.

* * * * *